(12) United States Patent
Hensley

(10) Patent No.: US 12,248,329 B2
(45) Date of Patent: Mar. 11, 2025

(54) TEMPERATURE SENSING ASSEMBLY FOR AN OVEN APPLIANCE

(71) Applicant: Haier US Appliance Solutions, Inc., Wilmington, DE (US)

(72) Inventor: Amelia Lear Hensley, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 703 days.

(21) Appl. No.: 17/462,559

(22) Filed: Aug. 31, 2021

(65) Prior Publication Data

US 2023/0060904 A1    Mar. 2, 2023

(51) Int. Cl.
*G05D 23/19*  (2006.01)
*A21B 1/40*  (2006.01)
*F24C 3/12*  (2006.01)
*F24C 7/08*  (2006.01)
*G05D 23/20*  (2006.01)

(52) U.S. Cl.
CPC ........... *G05D 23/1934* (2013.01); *A21B 1/40* (2013.01); *F24C 3/128* (2013.01); *F24C 7/085* (2013.01); *G05D 23/20* (2013.01)

(58) Field of Classification Search
CPC .... G05D 23/1934; G05D 23/20; F24C 3/128; F24C 7/085; A21B 1/40
USPC ....................................................... 126/19 R
See application file for complete search history.

(56) References Cited

U.S. PATENT DOCUMENTS

| | | | | |
|---|---|---|---|---|
| 2,933,585 | A * | 4/1960 | Holtkamp | G05D 23/1913 219/494 |
| 6,953,922 | B2 | 10/2005 | Lee | |
| 7,420,140 | B2 | 9/2008 | Barber | |
| 2016/0097542 | A1* | 4/2016 | Armstrong | F24C 7/082 99/337 |
| 2016/0324360 | A1* | 11/2016 | Boedicker | F24C 7/08 |

FOREIGN PATENT DOCUMENTS

DE    202010004437 U1 *  9/2010  ................ F24C 7/08

OTHER PUBLICATIONS

DE-202010004437-U1 Translation (Year: 2010).*

* cited by examiner

*Primary Examiner* — Steven B McAllister
*Assistant Examiner* — Benjamin W Johnson
(74) *Attorney, Agent, or Firm* — Dority & Manning, P.A.

(57) ABSTRACT

An oven appliance includes a cooking chamber positioned within a cabinet and a heating assembly for selectively heating the cooking chamber. The cooking chamber has two or more separate regions, and a temperature sensing assembly includes a temperature sensor positioned within each region of the cooking chamber. A switching assembly is coupled to the first temperature sensor and the second temperature sensor and is adjustable between a first position that connects the first temperature sensor to a controller and a second position that connects the second temperature sensor to the controller.

15 Claims, 3 Drawing Sheets

TEMPERATURE SENSING ASSEMBLY FOR AN OVEN APPLIANCE

FIELD OF THE INVENTION

The present subject matter relates generally to oven appliances, and more particularly, to temperature sensing assemblies for an oven appliance.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and/or a separate broiler heating assembly positioned at a top of the cooking chamber.

Conventional heating elements may be positioned at multiple locations within or just outside of the cooking chamber, e.g., to provide more even heating of the entire cavity. In addition, conventional ovens monitor the chamber temperature using a temperature sensor to ensure the chamber is at the desired temperature. However, conventional ovens only include a single sensor, thereby preventing the appliance controller from knowing the temperature at different regions within the chamber. While more temperature sensors may be desirable, control electronics for receiving temperature signals from multiple sensors may be costly and complex. For example, conventional control boards may include circuitry for receiving only a single temperature sensor input and incorporating another sensor may be difficult and expensive. Accordingly, such control boards and appliances may be incapable of performing a closed-loop cooking process due to the inability of getting feedback from multiple sensors.

Accordingly, an oven appliance with an improved temperature sensing assembly is desirable. More specifically, a temperature sensing assembly that can permit the use of multiple sensors to facilitate a closed loop cooking process while reducing control circuit complexity would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an oven appliance defining a vertical, a lateral, and a transverse direction is provided. The oven appliance includes a cabinet, a cooking chamber positioned within the cabinet, the cooking chamber defining a first region and a second region, a heating assembly positioned in thermal communication with the cooking chamber, a controller operably coupled to the heating assembly for selectively heating the cooking chamber, and a temperature sensing assembly in operative communication with the controller. The temperature sensing assembly includes a first temperature sensor positioned within the first region of the cooking chamber, a second temperature sensor positioned within the second region of the cooking chamber, a switching assembly operably coupled to the first temperature sensor and the second temperature sensor, the switching assembly being adjustable between a first position that connects the first temperature sensor to the controller and a second position that connects the second temperature sensor to the controller.

In another exemplary embodiment, a temperature sensing assembly for an oven appliance is provided. The oven appliance includes a cooking chamber defining a first region and a second region. The temperature sensing assembly includes a first temperature sensor positioned within the first region of the cooking chamber, a second temperature sensor positioned within the second region of the cooking chamber, and a switching assembly operably coupled to the first temperature sensor and the second temperature sensor, the switching assembly being adjustable between a first position that connects the first temperature sensor to a controller and a second position that connects the second temperature sensor to the controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
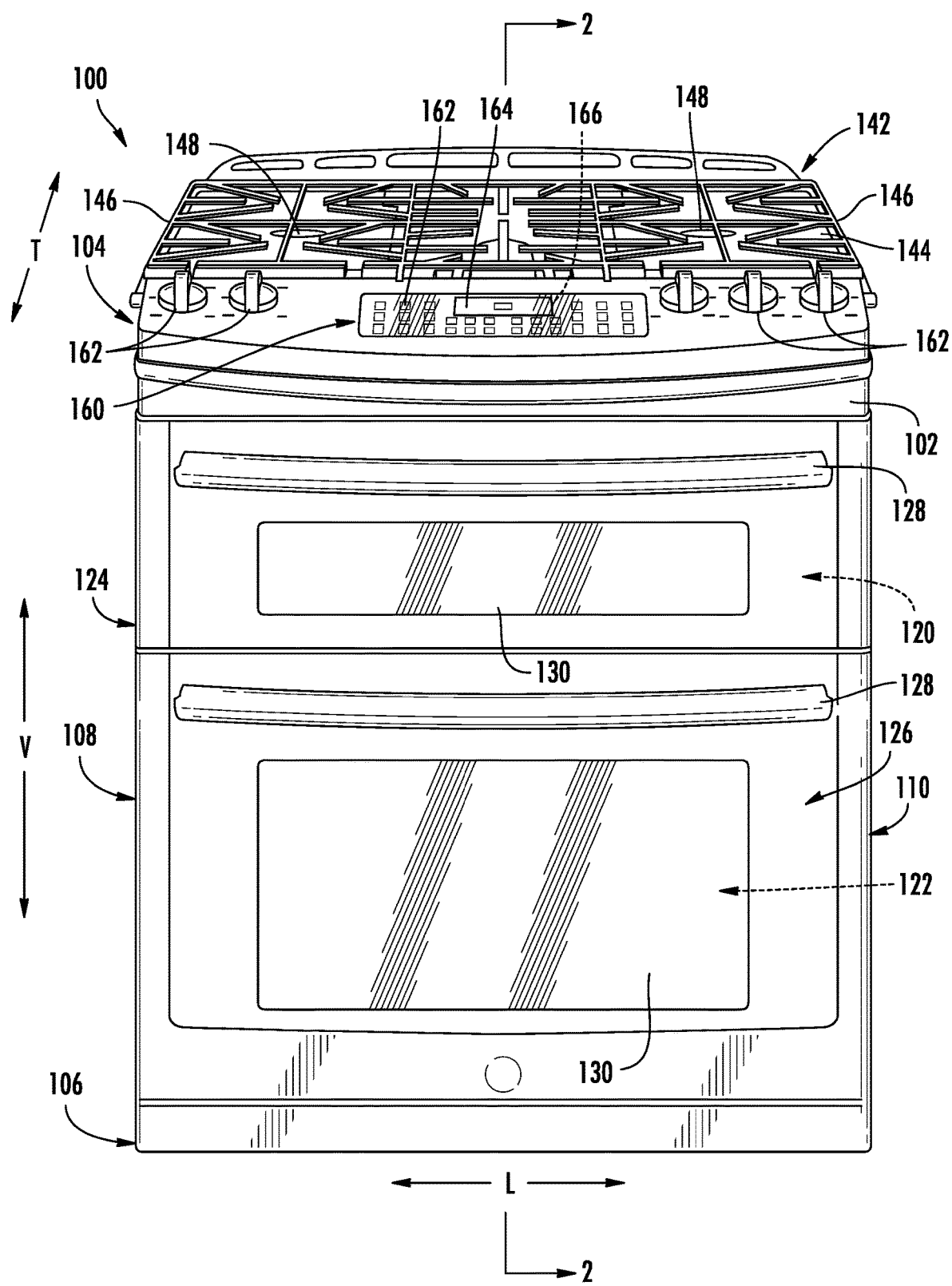
FIG. 1 is a front, perspective view of an oven appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of an oven appliance 100 as may be employed with the present subject matter. Oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is an upper cooking chamber 120 and a lower cooking chamber 122 configured for the receipt of one or more food items to be cooked. Thus, oven appliance 100 is generally referred to as a double oven range appliance. However, as will be understood by those skilled in the art, oven appliance 100 is provided by way of example only, and the present subject matter may be used in any suitable cooking appliance. Thus, the present subject matter may be used with other oven appliances such as wall ovens, electric ovens, gas ovens, microwave ovens, etc. In addition, the example embodiment shown in FIG. 1 is not intended to limit the present subject matter to any particular cooking chamber configuration or arrangement.

Oven appliance 100 includes an upper door 124 and a lower door 126 rotatably attached to cabinet 102 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Doors 124, 126 may include windows 130, constructed for example from multiple parallel glass panes to provide for viewing the contents of and insulating the insulated cooking chambers 120, 122.

As illustrated, each of insulated cooking chambers 120, 122 are defined by a plurality of chamber walls, identified generally herein by reference numeral 132. For example, insulated cooking chambers 120, 122 each include a top wall 134 and a bottom wall 136 which are spaced apart along the vertical direction V. A left sidewall and a right sidewall extend between the top wall 134 and bottom wall 136, and are spaced apart along the lateral direction L. A rear wall 138 may additionally extend between the top wall 134 and the bottom wall 136 as well as between the left sidewall and the right sidewall, and is spaced apart from doors 124, 126 along the transverse direction T. In this manner, when doors 124, 126 are in the closed position, cooking cavities are defined, and a front opening 140 is defined for each cooking chamber 120, 122, e.g., proximate front 112 of oven appliance 100.

Referring to FIG. 1, oven appliance 100 also includes a cooktop 142. Cooktop 142 is positioned at or adjacent top 104 of cabinet 102. Thus, cooktop 142 is positioned above upper cooking chamber 120 and includes a top panel 144 positioned proximate top 104 of cabinet 102. By way of example, top panel 144 may be constructed of glass, ceramics, enameled steel, and combinations thereof. One or more grates 146 are supported on a top surface of top panel 144 for supporting cooking utensils, such as pots or pans, during a cooking process. As shown in FIG. 1, oven appliance 100 may include a plurality of burners assemblies 148 mounted within or on top of top panel 144 underneath grates 146, and such burner assemblies 148 can be configured in various sizes so as to provide e.g., for the receipt of cooking utensils (i.e., pots, pans, etc.) of various sizes and configurations and to provide different heat inputs for such cooking utensils.

Figure 2:
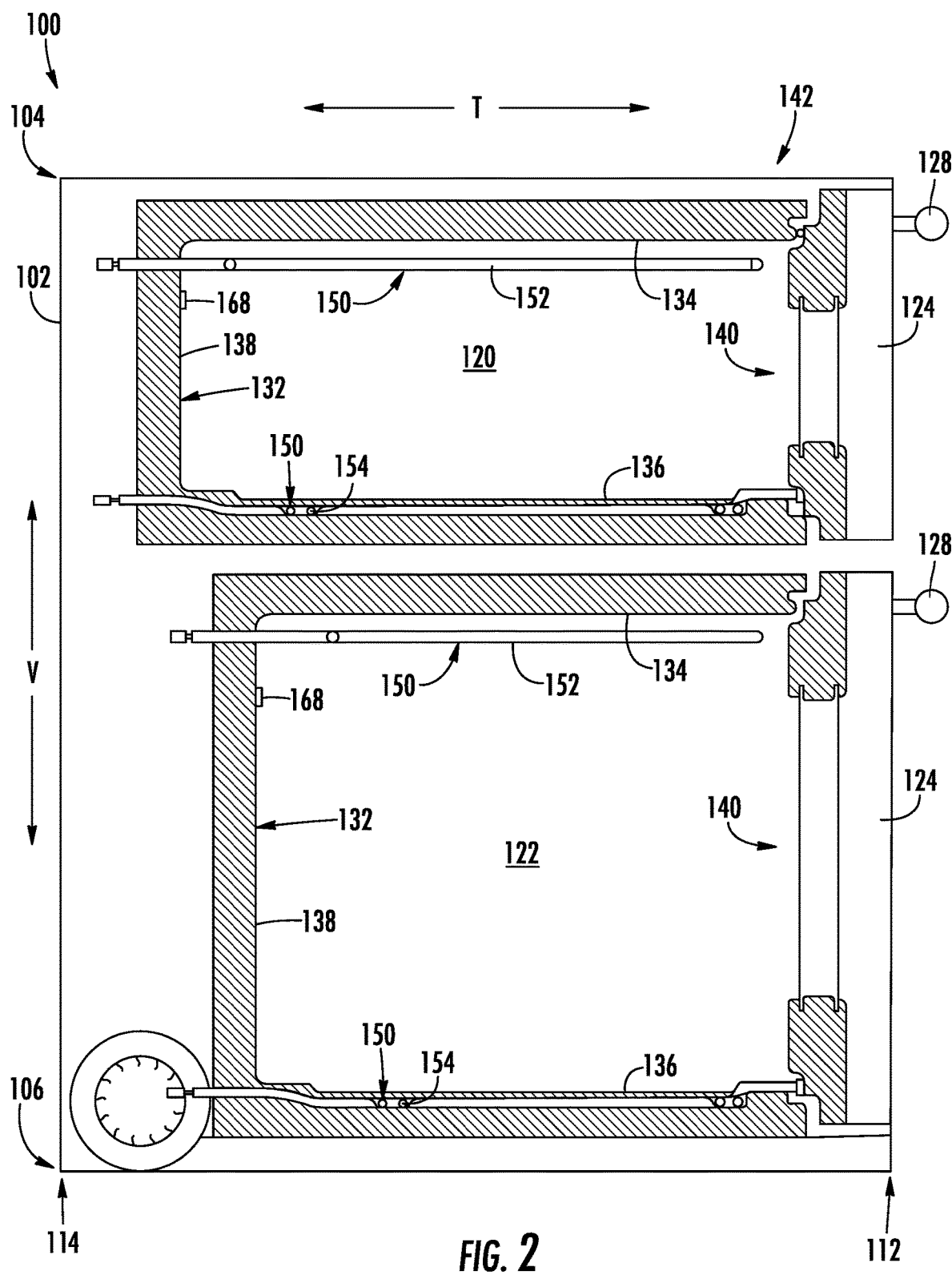
FIG. 2 is a cross sectional view of the exemplary oven appliance of FIG. 1, taken along Line 2-2 in FIG. 1.

Referring now specifically to FIG. 2, oven appliance 100 may include various heating elements 150, such as electric resistance heating elements, gas burners, microwave heating elements, halogen heating elements, electric tubular heaters (e.g., such as Calrod® heaters), or suitable combinations thereof. Heating elements 150 are positioned in thermal communication with upper cooking chamber 120 and lower cooking chamber 122 for heating upper cooking chamber 120 and lower cooking chamber 122.

Specifically, an upper heating element 152 (also referred to as a broil heating element, electric burner, or gas burner) may be positioned in cabinet 102, e.g., at a top portion of cooking chambers 120, 122, and a lower heating element 154 (also referred to as a bake heating element, electric burner, or gas burner) may be positioned proximate a bottom portion of cooking chambers 120, 122. Upper heating element 152 and lower heating element 154 may be used independently or simultaneously to heat cooking chambers 120, 122, perform a baking or broil operation, perform a cleaning cycle, etc. The size and heat output of heating elements 152, 154 can be selected based on, e.g., the size of oven appliance 100 or the desired heat output. Oven appliance 100 may include any other suitable number, type, and configuration of heating elements 150 within cabinet 102 and/or on cooktop 142. For example, oven appliance 100 may further include electric heating elements, induction heating elements, or any other suitable heat generating device.

One or more baking racks (not shown) may be positioned in insulated cooking chambers 120, 122 for the receipt of food items or utensils containing food items. The baking racks may be slidably received onto embossed ribs or sliding rails such that the baking racks may be conveniently moved into and out of insulated cooking chamber 120, 122 when doors 124, 126 are open.

A user interface panel 160 is located within convenient reach of a user of the oven appliance 100. For this example embodiment, user interface panel 160 includes knobs 162 that are each associated with one of heating elements 150. In this manner, knobs 162 allow the user to activate each heating element 150 and determine the amount of heat input provided by each heating element 150 to a cooking food items within cooking chambers 120, 122 or on cooktop 142. Although shown with knobs 162, it should be understood that knobs 162 and the configuration of oven appliance 100 shown in FIG. 1 is provided by way of example only. More specifically, user interface panel 160 may include various input components, such as one or more of a variety of touch-type controls, electrical, mechanical or electro-mechanical input devices including rotary dials, push buttons, and touch pads. User interface panel 160 may also be provided with one or more graphical display devices or display components 164, such as a digital or analog display device designed to provide operational feedback or other information to the user such as e.g., whether a particular heating element 150 is activated and/or the rate at which the heating element 150 is set.

Generally, oven appliance 100 may include a controller 166 in operative communication with user interface panel 160. User interface panel 160 of oven appliance 100 may be in communication with controller 166 via, for example, one or more signal lines or shared communication busses, and signals generated in controller 166 operate oven appliance 100 in response to user input via user input devices 162. Input/Output ("I/O") signals may be routed between controller 166 and various operational components of oven appliance 100 such that operation of oven appliance 100 can be regulated by controller 166. In addition, controller 166 may also be communication with one or more sensors, such as temperature sensor 168 (FIG. 2), which may be used to measure temperature inside cooking chamber 120 and provide such measurements to the controller 166. Although temperature sensor 168 is illustrated at a top and rear of cooking chambers 120, 122, it should be appreciated that other sensor types, positions, and configurations may be used according to alternative embodiments.

Controller 166 is a "processing device" or "controller" and may be embodied as described herein. Controller 166 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 166 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of a double oven appliance including a cooktop, it should be appreciated that oven appliance 100 is provided by way of example only. In this regard, the present subject matter is not limited to any particular style, model, or configuration of oven appliance 100. For example, other oven or range appliances having different configurations, different appearances, and/or different features may also be utilized with the present subject matter as well, e.g., single ovens, electric cooktop ovens, gas cooktops ovens, etc. Moreover, aspects of the present subject matter may be used in any other consumer or commercial appliance where it is desirable to efficiently monitor parameters within a chamber.

Figure 3:
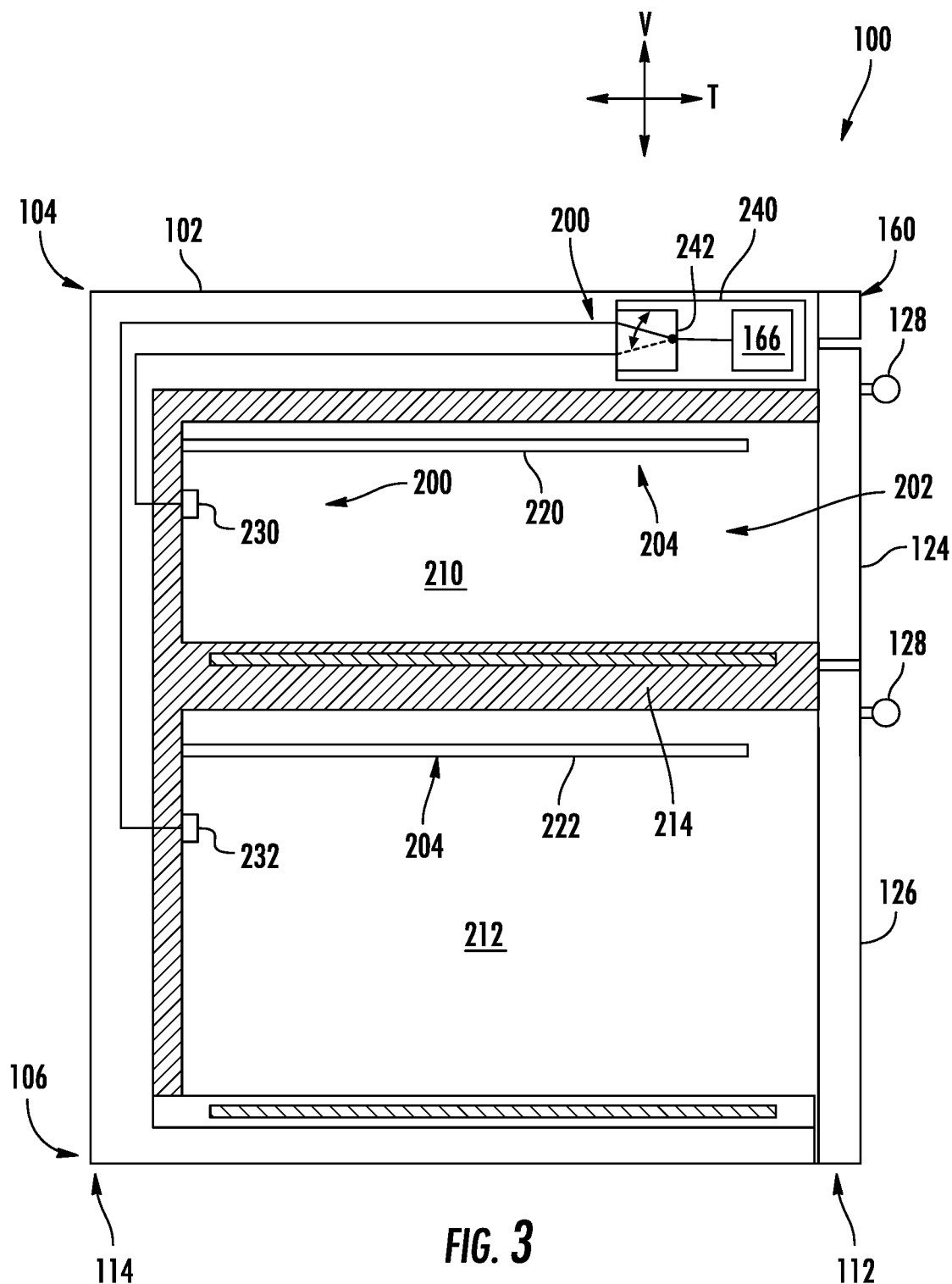
FIG. 3 is a schematic side view an oven appliance including a temperature sensing assembly according to an exemplary embodiment of the present subject matter.

Referring now specifically to FIG. 3, a temperature sensing assembly 200 which may be used to monitor temperatures within oven appliance 100 will be described according to an exemplary embodiment of the present subject matter. In this regard, for example, temperature sensing assembly 200 may include two or more temperature sensors positioned at different locations within oven appliance 100 for monitoring temperatures at their respective locations. Notably, FIG. 3 illustrates a simplified schematic view of oven appliance 100 to facilitate description of the temperature sensing assembly 200. However, like reference numerals may be used in FIG. 3 to describe the same or similar components as those described above.

As shown, oven appliance 100 may generally define a cooking chamber 202 that is configured for receiving food items to be cooked and which is in thermal communication with a heating assembly 204 for selectively heating cooking chamber 202. More specifically, according to the illustrated embodiment, cooking chamber 202 may generally define a first region 210 and a second region 212 that are spaced apart from each other. More specifically, according to the illustrated embodiment, first region 210 and second region 212 are separated by a partition 214 that defines cooking chamber 202 (e.g., such that first region 210 corresponds to upper cooking chamber 120 and a second region 212 corresponds to lower cooking chamber 122). Notably, although two separate and thermally isolated regions 210, 212 are illustrated, it should be appreciated that aspects of the present subject matter do not require the use of partition 214 but may instead be used to monitor temperatures within different locations in a single chamber.

As illustrated, heating assembly 204 may generally include a first heating element 220 that is in thermal communication with first region 210 of cooking chamber 202 and a second heating element 222 that is in thermal communication second region 212 of cooking chamber 202. In this manner, controller 166 may selectively operate first heating element 220 and second heating element 222 to selectively regulate the temperatures within first region 210 and second region 212, respectively. As will be described in more detail below, temperature sensing assembly 200 may be in operative communication with controller 166 to facilitate a closed-loop cooking process to regulated region temperatures. In this regard, as would be understood by one having ordinary skill in the art, a closed-loop cooking process generally refers to a heating operation that relies on temperature feedback from one or more temperature sensors.

According to the illustrated embodiment, temperature sensing assembly 200 may generally include a first temperature sensor 230 that is positioned within first region 210 of cooking chamber 202 and a second temperature sensor 232 that is positioned within second region 212 of cooking chamber 202. As used herein, "temperature sensor" or the equivalent is intended to refer to any suitable type of temperature measuring system or device positioned at any suitable location for measuring the desired temperature. Thus, for example, temperature sensors 230, 232 may each be any suitable type of temperature sensor, such as a thermistor, a thermocouple, a resistance temperature detector, a semiconductor-based integrated circuit temperature sensors, etc. In addition, temperature sensors 230, 232 may be positioned at any suitable location and may output a signal, such as a voltage, to a controller that is proportional to and/or indicative of the temperature being measured. Although exemplary positioning of temperature sensors is described herein, it should be appreciated that oven appliance 100 may include any other suitable number, type, and position of temperature sensors according to alternative embodiments.

According to exemplary embodiments, first temperature sensor 230 may be positioned proximate a top of cooking chamber 202 along the vertical direction V (e.g., proximate top 104 of cabinet 102) and second temperature sensor 232 may be positioned proximate a bottom 106 of cooking chamber 202 along the vertical direction V (e.g., proximate bottom 106 of cabinet 102). In this regard, first region 210 (e.g., upper cooking chamber 120) may be positioned above second region 212 (e.g., lower cooking chamber 122) along the vertical direction V. However, it should be appreciated that other chamber configurations and sensor positions may be used while remaining within the scope of the present subject matter. For example, temperature sensing assembly 200 may further include a third temperature sensor (not shown) that is positioned within a third region (not shown) of cooking chamber 202.

Notably, as explained briefly above, the number of sensor inputs or ports available on a control board (e.g., for communicating with controller 166) may be less than the number of temperature sensors in an oven appliance. For example, using oven appliance 100 as an example, controller 166 may be mounted on a control board 240 that has only a single electrical connector for receiving a temperature sensor signal. Accordingly, aspects of the present subject matter may be directed to systems and methods for facilitating the incorporation of more temperature sensors into an oven appliance for monitoring by an appliance controller.

In this regard, as shown schematically in FIG. 3, temperature sensing assembly 200 may include a switching assembly 242 that is operably coupled to first temperature sensor 230 and second temperature sensor 232. In general, switching assembly 242 is configured to facilitate the connection of a plurality of sensors to a controller (e.g., such as controller 166) when the controller itself does not have the same number of electrical connections or terminals for separately receiving each of the plurality of sensors. Although the present subject matter discusses the use of a switching assembly in an oven appliance having two temperature sensors, it should be appreciated that aspects of the present subject matter may apply to any appliance having any suitable number and type sensors.

According to exemplary embodiments, switching assembly 242 is adjustable between a first position that connects first temperature sensor 230 to controller 166 and a second position that connects second temperature sensor 232 to controller 166. In addition, according to the illustrated embodiment, connecting one temperature sensor disconnects the other. Accordingly, switching assembly 242 disconnects second temperature sensor 232 in the first position and disconnects first temperature sensor 230 in the second position. It should be appreciated that according to alternative embodiments, switching assembly 242 may be positioned in a third position or other positions for connecting any suitable subset of a total of plurality of sensors within an appliance. For example, switching assembly 242 may be operably coupled to the third temperature sensor positioned in a third region of the cooking chamber, and switching assembly 242 may be adjustable to a third position that connects the third temperature sensor to controller 166.

In general, switching assembly 242 may be any suitable device or devices for selectively diverting, connecting, or controlling signals from one or more temperature sensors. For example, according to an exemplary embodiment, switching assembly 242 may include one or more mechanical switches or physical contacts that change position to connect and/or disconnect first temperature sensor 230 and second temperature sensor 232. According to alternative embodiments, switching assembly 242 may include circuits integrated onto control board 240 for diverting the appropriate temperature signal to controller 166. In this regard, according to an exemplary embodiment, controller 166 and switching assembly 242 may both be mounted to control board 240 of oven appliance 100. According to still other embodiments, switching assembly 242 may be an independent device that is separately mounted within oven appliance 100 and is an electrical communication with both first temperature sensor 230 and second temperature sensor 232.

According to exemplary embodiments, controller 166 may be configured to alternate switching assembly 242 between the first position and the second position (e.g., or additional positions) according to a predetermined schedule. In this regard, for example, switching assembly 242 may be operably coupled to a simple timer and may switch back and forth between connecting first temperature sensor 230 and second temperature sensor 232 at a predetermined frequency, such as a once every minute, once every five minutes, once every 10 minutes, etc.

According to alternative exemplary embodiments, switching assembly 242 may be programmed to connect first temperature sensor 230 and second temperature sensor 232 for different durations. For example, switching assembly 242 may connect first temperature sensor 230 for a first sensing interval and second temperature sensor 232 for a second sensing interval, the second sensing interval being different than the first sensing interval. For example, according to an exemplary embodiment, the sensing intervals for each respective temperature sensor 230, 232 may be proportional in duration to heating powers (e.g., in Watts) of first heating element 220 and second heating element 222, respectively. In this regard, if first heating element 220 is a high-power heating element and second heating element 222 is a low-power heating element, the first sensing interval for first temperature sensor 230 may be longer than the second sensing interval for second temperature sensor 222.

In addition, it should be appreciated that controller 166 may implement a closed-loop control process whereby feedback from temperature sensors 230, 232 are used in determining when to operate first heating element 220 and second heating element 222 to achieve a target temperature within their respective regions 210, 212. In addition, controller 166 may operate switching assembly 242 to connect the temperature sensor corresponding to the region currently being heated. In this regard, first heating element 220 may operate only while switching assembly 242 is in the first position and second heating element 222 may operate only while switching assembly 242 is in the second position. Other operating configurations are possible and within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
   a cabinet;
   a cooking chamber positioned within the cabinet, the cooking chamber defining a first region and a second region;
   a heating assembly positioned in thermal communication with the cooking chamber, wherein the heating assembly comprises a first heating element in thermal communication with the first region of the cooking chamber and a second heating element in thermal communication with the second region of the cooking chamber;
   a controller operably coupled to the heating assembly for selectively heating the cooking chamber; and
   a temperature sensing assembly in operative communication with the controller, the temperature sensing assembly comprising:
      a first temperature sensor positioned within the first region of the cooking chamber;
      a second temperature sensor positioned within the second region of the cooking chamber; and
      a switching assembly operably coupled to the first temperature sensor and the second temperature sensor, the switching assembly being adjustable between a first position that connects the first temperature sensor to the controller and a second position that connects the second temperature sensor to the controller, wherein the controller is configured to cause the switching assembly to connect the first temperature sensor for a first sensing interval and the second temperature sensor for a second sensing interval, the first sensing interval and the second sensing interval being proportional in duration to heating powers of the first heating element and the second heating element, respectively.

2. The oven appliance of claim 1, wherein the first temperature sensor is positioned proximate a top of the cooking chamber along the vertical direction and the second temperature sensor is positioned proximate a bottom of the cooking chamber along the vertical direction.

3. The oven appliance of claim 1, further comprising:
   a partition that divides the cooking chamber into the first region and the second region and provides thermal isolation between the first region and the second region.

4. The oven appliance of claim 1, wherein the first region is above the second region along the vertical direction.

5. The oven appliance of claim 1, wherein the controller is configured to alternate the switching assembly between the first position and the second position according to a predetermined schedule.

6. The oven appliance of claim 1, wherein the switching assembly disconnects the second temperature sensor in the first position and disconnects the first temperature sensor in the second position.

7. The oven appliance of claim 1, wherein the controller is configured to implement a closed-loop temperature control process using temperature measurements received from the first temperature sensor and the second temperature sensor.

8. The oven appliance of claim 1, wherein the temperature sensing assembly further comprises:
   a third temperature sensor positioned within a third region of the cooking chamber, wherein the switching assembly is operably coupled to the third temperature sensor and is adjustable to a third position that connects the third temperature sensor to the controller.

9. The oven appliance of claim 1, wherein the oven appliance comprises:
   a control board, wherein the controller and the switching assembly are mounted to the control board.

10. The oven appliance of claim 1, wherein the first temperature sensor and the second temperature sensor each comprise a thermocouple or a thermistor.

11. A temperature sensing assembly for an oven appliance, the oven appliance comprising a cooking chamber defining a first region and a second region and a heating assembly comprising a first heating element in thermal communication with the first region of the cooking chamber and a second heating element in thermal communication with the second region of the cooking chamber, the temperature sensing assembly comprising:
   a first temperature sensor positioned within the first region of the cooking chamber;
   a second temperature sensor positioned within the second region of the cooking chamber; and
   a switching assembly operably coupled to the first temperature sensor and the second temperature sensor, the switching assembly being adjustable between a first position that connects the first temperature sensor to a controller and a second position that connects the second temperature sensor to the controller, wherein the controller is configured to cause the switching assembly to connect the first temperature sensor for a first sensing interval and the second temperature sensor for a second sensing interval, the first sensing interval and the second sensing interval being proportional in duration to heating powers of the first heating element and the second heating element, respectively.

12. The temperature sensing assembly of claim 11, wherein the oven appliance comprises:
   a partition that divides the cooking chamber into the first region and the second region and provides thermal isolation between the first region and the second region.

13. The temperature sensing assembly of claim 11, wherein the controller is configured to alternate the switching assembly between the first position and the second position according to a predetermined schedule.

14. The temperature sensing assembly of claim 11, wherein the switching assembly disconnects the second temperature sensor in the first position and disconnects the first temperature sensor in the second position.

15. The temperature sensing assembly of claim 11, further comprising:
a third temperature sensor positioned within a third region of the cooking chamber, wherein the switching assembly is operably coupled to the third temperature sensor and is adjustable to a third position that connects the third temperature sensor to the controller.

* * * * *